UNITED STATES PATENT OFFICE.

C. FEODOR FUCHS AND ARMINIUS CLEMENT, OF BOSTON, MASSACHUSETTS.

IMPROVEMENT IN GUN AND BLASTING POWDERS.

Specification forming part of Letters Patent No. 130,123, dated August 6, 1872.

Specification describing a certain compound called "Shell Powder," invented by C. FEODOR FUCHS and ARMINIUS CLEMENT, of Boston, Massachusetts, to be used for gun, blasting, and sporting powder.

The nature of this invention consists in mixing saltpeter, sulphur, charcoal, chlorate of potassa dissolved in water, and finely-ground tortoise or turtle shell.

To prepare the powder, take six parts of saltpeter, one and one-eighth part of sulphur or brimstone, one part of charcoal, thus making an ordinary preparation of gunpowder; add thereto one and one-quarter part of chlorate of potassa dissolved in pure water, and five-eighths of one part of carefully-dried and finely-ground tortoise or turtle shell. Mix these parts in an earthen or wooden vessel until well amalgamated; leave them to dry slowly, and then granulate them into any desirable-sized grains for the uses above mentioned. This powder will prove to be, first, cleaner; secondly, of higher velocity; thirdly, will show less recoil and pressure on the gun; and, fourthly, is explosive only when tightly confined in cartridges or gun-barrel, &c.

We claim as our invention—

A compound composed of the above-mentioned chlorate of potassa and tortoise or turtle shell, in addition to saltpeter, sulphur, and charcoal, as and for the purposes set forth.

C. FEODOR FUCHS.
ARMINIUS CLEMENT.

Witnesses:
L. SCHULER SCHUTZ,
J. B. L. PACKARND.